(12) United States Patent
Zheng (10) Patent No.: US 8,769,123 B2
(45) Date of Patent: *Jul. 1, 2014

(54) APPARATUS, AND ASSOCIATED METHOD, FOR FACILITATING QOS AND BEARER SETUP IN AN IP-BASED COMMUNICATION SYSTEM

(75) Inventor: Haihong Zheng, Coppell, TX (US)

(73) Assignee: Intellectual Ventures I LLC, Wilmington, DE (US)

( * ) Notice: Subject to any disclaimer, the term of this patent is extended or adjusted under 35 U.S.C. 154(b) by 74 days.

This patent is subject to a terminal disclaimer.

(21) Appl. No.: 13/178,024

(22) Filed: Jul. 7, 2011

(65) Prior Publication Data

US 2011/0270958 A1 Nov. 3, 2011

Related U.S. Application Data

(63) Continuation of application No. 09/992,790, filed on Nov. 5, 2001, now Pat. No. 7,987,270.

(51) Int. Cl.
*G06F 15/16* (2006.01)
(52) U.S. Cl.
USPC .......................................................... 709/228
(58) Field of Classification Search
USPC ................. 709/220–222, 227–229, 230–244; 370/349, 389, 352
See application file for complete search history.

(56) References Cited

U.S. PATENT DOCUMENTS

| | | | |
|---|---|---|---|
| 5,752,162 A * | 5/1998 | Sawyer et al. | 455/13.1 |
| 5,867,495 A | 2/1999 | Elliott et al. | |
| 6,061,650 A * | 5/2000 | Malkin et al. | 704/228 |
| 6,266,695 B1 | 7/2001 | Huang et al. | |
| 6,335,927 B1 | 1/2002 | Elliott et al. | |
| 6,614,781 B1 | 9/2003 | Elliott et al. | |
| 6,714,515 B1 | 3/2004 | Marchand | |
| 6,754,181 B1 | 6/2004 | Elliott et al. | |
| 6,765,912 B1 | 7/2004 | Vuong | |
| 6,785,510 B2 | 8/2004 | Larsen | |
| 6,785,912 B1 | 9/2004 | Julio | |
| 6,816,912 B1 | 11/2004 | Borella et al. | |
| 6,892,389 B1 | 5/2005 | Dekeyser | |
| 6,894,994 B1 | 5/2005 | Grob et al. | |
| 6,915,345 B1 * | 7/2005 | Tummala et al. | 709/225 |
| 6,925,075 B2 | 8/2005 | Karagiannis | |
| 6,934,274 B2 * | 8/2005 | Inoue et al. | 370/338 |

(Continued)

FOREIGN PATENT DOCUMENTS

EP 1047244 A1 10/2000

OTHER PUBLICATIONS

C. Perkins. RFC 2012. IP Mobility Support, Oct. 1996.*

(Continued)

*Primary Examiner* — Brendan Higa (57) ABSTRACT

Apparatus, and an associated method, for generating a bearer setup request in a mobile, or other, communication system. An application-level bearer setup request generator is positioned at the application level of the communication system. A request is forwarded to a transport level. And a bearer setup request signal generator, located at the transport level, generates a transport-level bearer setup request that is routed to the bearer manager. Bearer setup is performed by the bearer manager and a response is provided through the transport layer to the application level, and back to a communication node when the bearer setup is performed.

13 Claims, 6 Drawing Sheets

(56) References Cited

U.S. PATENT DOCUMENTS

| | | | |
|---|---|---|---|
| 6,948,076 B2 | 9/2005 | Saito | |
| 6,980,801 B1 | 12/2005 | Soininen et al. | |
| 7,382,748 B1* | 6/2008 | Bharatia et al. | 370/331 |
| 7,464,177 B2* | 12/2008 | Shimizu | 709/238 |
| 7,610,393 B1* | 10/2009 | Chen et al. | 709/230 |
| 2002/0068545 A1* | 6/2002 | Oyama et al. | 455/406 |
| 2002/0091760 A1 | 7/2002 | Rozen | |
| 2002/0114305 A1 | 8/2002 | Oyama et al. | |
| 2002/0147021 A1 | 10/2002 | June | |
| 2003/0219000 A1* | 11/2003 | Magret | 370/338 |

OTHER PUBLICATIONS

Final Office Action on U.S. Appl. No. 09/992,790, mailed Mar. 26, 2010.
Final Office Action on U.S. Appl. No. 09/992,790, mailed Jul. 27, 2006.
Final Office Action on U.S. Appl. No. 09/992,790, mailed Oct. 17, 2007.
International Preliminary Examination Report on PCT/IB02/04187, completed Jun. 27, 2003.
International Search Report on PCT/IB02/04187, mailed Mar. 18, 2003.
Non-Final Office Action on U.S. Appl. No. 09/992,790, mailed Jan. 26, 2009.
Non-Final Office Action on U.S. Appl. No. 09/992,790, mailed Jul. 1, 2005.
Non-Final Office Action on U.S. Appl. No. 09/992,790, mailed Aug. 26, 2010.
Non-Final Office Action on U.S. Appl. No. 09/992,790, mailed Oct. 6, 2009.
Non-Final Office Action on U.S. Appl. No. 09/992,790, mailed Dec. 29, 2005.
Non-Final Office Action on U.S. Appl. No. 09/992,790, mailed Apr. 19, 2007.
Notice of Allowance on U.S. Appl. No. 09/992,790, mailed Mar. 15, 2011.
Restriction Requirement on U.S. Appl. No. 09/992,790, mailed Jun. 20, 2008.
Pat R. Calhoun Sun Laboratories et al.: "Diameter mobile IP Extensions; Draft-Calhoun-Diameter-Mobileip-12.txt," by Pat R. Calhoun Sun Laboratories et al.; IETF Standard-Working-Draft, Internet Engineering Task Force, IETF, CH, No. 12, Feb. 1, 2001.
Stefano Faccin Franck Le Srinivas Sreemanthula Haihong Zheng Nokia Research Center; "Profile Management Framework and Diameter Profile Management Application; draft-zheng-diameter-pma-co.tex," IETF Standard-Working-Draft, Internet Engineering Task Force, IETF, CH, Nov. 1, 2001.
Supplemental European Search Report issued in related European Application No. 02772733.8 on Oct. 4, 2010.

\* cited by examiner

APPARATUS, AND ASSOCIATED METHOD, FOR FACILITATING QOS AND BEARER SETUP IN AN IP-BASED COMMUNICATION SYSTEM

CROSS-REFERENCE TO RELATED APPLICATION

This application is a continuation application of U.S. patent application Ser. No. 09/992,790, filed Nov. 5, 2001, which is incorporated herein by reference in its entirety.

The present invention relates generally to a manner by which to facilitate setup of QoS or a bearer between an IP node, operable in an IP-based communication system, and a correspondent node. More particularly, the present invention relates to apparatus, and an associated method, by which to initiate, at the network of the communication system, the QoS or bearer setup. A request of a QoS or bearer manager to perform the QoS or bearer setup is generated at an application-level entity, such as at an application server. The request is provided to a transport-level entity, such as an AAA (Authentication Authorization Accounting) entity defined pursuant to an IETF (Internet Engine Task Force) proposal. The need otherwise to provide a separate, direct interface between the application-level entity and the QoS or bearer manager is obviated. Through the use of an AAA entity of existing AAA infrastructure, an already-existing entity is utilized, and the request is routed to the QoS or bearer manager utilizing merely extensions to an existing protocol.

BACKGROUND OF THE INVENTION

The use of communication systems through which to communicate data between two or more locations is a necessary adjunct of modem society. In a communication system, data sourced, or originated, at a sending station is communicated, by way of a communication channel to a receiving station. The sending station forms a first endpoint, and the receiving station forms a second endpoint between which the data is communicated. When the endpoints include both sending and receiving stations, two-way communication of data is permitted.

The introduction, and popular usage, of new types of communication systems has been made possible as a result of advancements in communication technologies. Through the use of such communication systems, for example, data can be communicated between the endpoints at higher data transmission rates. And, new types of communication services, requiring data transmissions at the increased rates, or throughputs, have been made possible, as a result. Advancements in digital communication techniques are amongst the advancements in communication technologies that have permitted the introduction of new types of communication services.

A radio communication system is exemplary of a communication system in which communication-technology advancements have been implemented. In a radio communication system, a radio link is used to form at least a part of a communication path extending between communication endpoints and upon which a communication channel is defined. Because of the radio link, communications in a radio communication system inherently provides improved communication mobility relative to conventional, wireline communication systems. Wirelines, otherwise required upon which to form the communication path, are obviated. Communications are effectual, as a result, from, and between, endpoints positioned at locations at which the use of a conventional, wireline communication system would be impractical.

A cellular communication system is a type of radio communication system that is popularly utilized. A cellular communication system is a multi-user system, the implementation of which has been made possible due to advancements in communication technologies.

Various standards have been promulgated relating to various types of cellular communication systems, and various types of cellular communication systems have been constructed corresponding to such standards. Successive generations of cellular communication systems have been proposed, some of which have been implemented. So-called, first-generation communication systems generally rely upon analog communication techniques. So-called, second-generation communication systems generally make use of digital communication techniques. And, so-called, third-generation communication systems also make use of digital communication techniques. Third-generation systems, amongst other things, also provide for multiple data-rate communications. Additional proposals are being set forth for a subsequent-generation communication system. Generally, such proposals pertain to packet-based radio communication systems in which packet-formatted data is communicated.

Such proposals include proposals to the IETF (Internet Engine Task Force). In at least one proposal, communications between two endpoints, such as a mobile node and a correspondent node, are effectuated by setting up a bearer between the endpoints. The term "bearer" is used, generally, to refer to a connection, at least upon a radio link extending to the mobile node from a network part of the communication system. And, the bearer generally refers to an entity formed by all factors that affect data transmission upon the radio link extending to the mobile node. For instance, the data transmission rate, delay, and bit error ratio are all factors that are determinative of the bearer. The procedure and process of setting up of the bearer is sometimes referred to as a bearer setup. And, a bearer manager is a network entity, located, for instance, at an access network, that controls the bearer setup procedures.

Existing proposals relating to mechanisms and procedures associated with bearer setup require that a direct interface be utilized to route a bearer setup request to an appropriate bearer manager. For instance, when the network part of the communication system includes application servers, the direct interface is required to be positioned between an application server and the bearer manager. This requirement lacks scalability.

For instance, when a mobile node with which a bearer is to be formed is in a visited network, and an application server which forms the home application server of the mobile node initiates the bearer setup, the application server must know the address of the bearer manager in the visited network. As the mobile node could reside in any visited network, the application server must, therefore, have knowledge of the addresses of all the bearer managers in all of the visited networks that may be visited by the mobile node. When the application server that initiates the bearer setup is located in the visited network at which the mobile node is located, a direct interface between the visited application server and the bearer manager still may not exist, particularly when the application service provider and the transport network provider are not the same. And, even when the application service and transport network providers are the same, there may be multiple bearer managers serving different endpoints in the visited network. The application server in the visited network still must need to be cognizant of which bearer manager should be contacted for a particular endpoint.

As, therefore, the existing mechanisms and protocols are inadequate to permit efficient bearer setup, an improved manner by which to facilitate bearer setup is required.

It is in light of this background information related to bearer setup in a radio communication system that the significant improvements of the present invention have evolved.

SUMMARY OF THE INVENTION

The present invention, accordingly, advantageously provides apparatus, and an associated method, by which to facilitate setup of a bearer between a mobile node, operable in an IP-based communication system, and a correspondent node.

Through operation of an embodiment of the present invention, a manner is provided by which to initiate, at the network of the communication system, a bearer setup. A separate, direct interface otherwise required to be positioned between an application-level entity and a bearer manager is obviated. Extensions of existing protocols are used to deliver the request to a selected bearer manager, and extensions to the existing protocol are utilized to return a response to the request for the bearer setup. A scalable bearer setup scheme is provided, and delays associated with existing proposed bearer setup initiation schemes are reduced.

In one aspect of the present invention, a request is generated to request a selected bearer manager to perform bearer setup. The request is generated at an application-level entity, such as at an application server. The request is provided to a transport-level entity, such as an AAA (Authentication Authorization Accounting) entity, defined pursuant to an IETF (Internet Engine Task Force) proposal. Because existing transport-level entities, already defined, are utilized to initiate the bearer setup, complexities associated with alternate bearer setup procedures are avoided.

In one aspect of the present invention, support is provided for a network-initiated bearer setup. A bearer setup request generated at an application server at an application-level of the communication network is routed to an appropriate bearer manager by way of the AAA infrastructure of the communication network. The existing infrastructure is utilized, and the requirement otherwise to provide a direct interface, positioned between the application server and the bearer manager, is obviated.

In one implementation, the network-initiated bearer setup is initiated at a home application server of the mobile node. An application-level, QoS (Quality of Service) generated at an endpoint, such as a mobile node, is forwarded to the home-network application service. Responsive thereto, the home-network application server generates a bearer setup request to a home-network AAA entity of the AAA infrastructure. An AAA message that carried the bearer setup request is forwarded by the home-network AAA to a visited-network AAA after additional authentication and authorization procedures are performed by the home-network AAA. Since the AAA infrastructure routes the AAA message based on the realm of the user identifier, there is not need for the AAA entity in the home network to know the exact address of the AAA entity in the visited network. Therefore, no direct interface is needed between AAA entity in the home network and the AAA entity in the visited network. The scalability has therefore been highly improved. After receiving the AAA message with the bearer setup request, the AAA entity in the visited-network, in turn, transforms the AAA message into a bearer setup message and then forwards the message to the bearer manager associated therewith. The bearer manager performs the bearer setup and generates a bearer-setup response to the AAA entity in the visited network. The bearer setup response is then transformed into a AAA message and then routed through the AAA infrastructure in a direction reverse to that by which the initial request is routed to the bearer manager.

In another implementation, the network-initiated bearer setup originates at a visited-network application server of the visited network at which the mobile node is located. An application-level QoS request, generated at an endpoint, such as the mobile node, is provided to the visited-network application server. The visited-network application server generates a bearer setup request that is forwarded to a visited-network AAA of the AAA infrastructure. The bearer setup request is formatted pursuant to AAA protocol. When delivered to the visited-network AAA, authentication and authorization procedures are carried out either in the home network or in the visited network, and, then, the visited-network AAA forwards the message to the bearer manager associated therewith. The bearer manager performs the bearer setup and generates a response that is routed, by way of the AAA infrastructure back to the visited-network application server. The response is then provided to the requesting endpoint, such as the mobile node.

In these and other aspects, therefore, apparatus, and an associated method, is provided for a communication system having a mobile node selectable operable to communicate by way of a communication network with a correspondent node. The communication network has at least a first application-level entity. Bearer setup of a bearer between the mobile node and the correspondent node through operation of a selected bearer manager is facilitated. The selected bearer manager has a network identifier identifying a network location thereof. A first bearer setup request generator is associated with the first application-level entity. The first bearer setup request generator generates a first bearer setup request. The first bearer setup request requests the selected bearer manager to create the bearer between the mobile node and the correspondent node. The first bearer setup request, when generated at the first application-level entity, is free of the network identifier identifying the network location.

A more complete appreciation of the present invention and the scope thereof can be obtained from the accompanying drawings which are briefly summarized below, the following detailed description of the presently-preferred embodiments of the present invention, and the appended claims.

DETAILED DESCRIPTION

Figure 1:
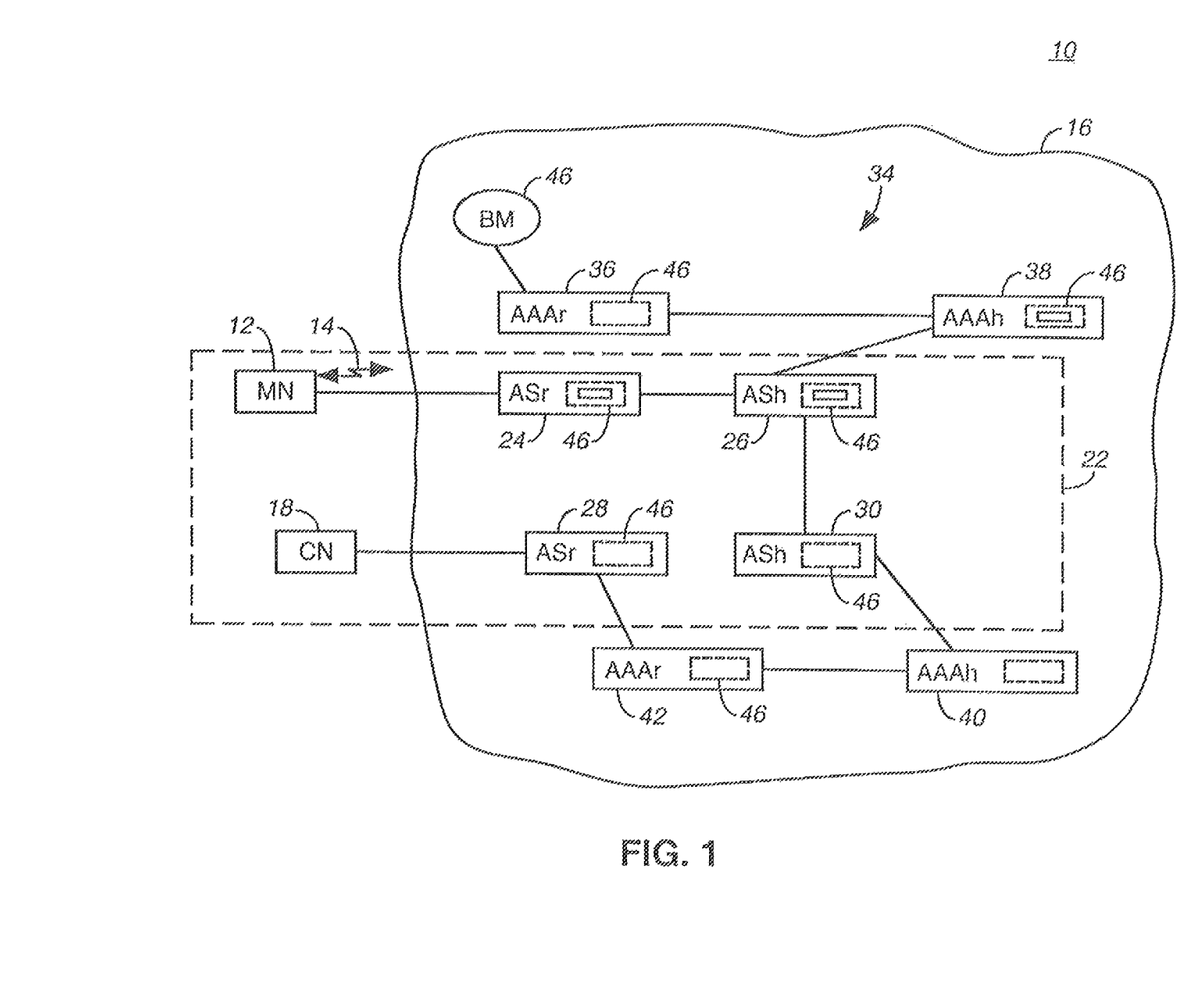
FIG. 1 illustrates a functional block diagram of a communication system in which an embodiment of the present invention is operable.

Referring first to FIG. 1, a communication system, shown generally at 10, provides for radio communications with a mobile node 12. The communication system is a multi-user communication system, permitting a plurality of mobile nodes to communicate concurrently therethrough. In the exemplary implementation shown in the figure, the communication system 10 operates pursuant to a proposed operating standard submitted to the IETF (Internet Engine Task Force) that is to provide for voice, and other data, communications with mobile nodes operable therein. While the following description of exemplary operation of various embodiments of the present invention shall be described with respect to the implementation of the communication system 10 as a system operable pursuant to such a proposed, IETF operating standard, it should be understood at the outset that the teachings of the present invention are analogously also implementable in other types of communication systems.

Communications are effectuated with the mobile node by way of a radio link, here represented by the arrow 14. The mobile node communicates by way of a network part 16 of the communication system with a correspondent node 18. The correspondent node is here also represented to be a mobile node. The correspondent node, alternately, can form a wireline device, connected by way of conventional wireline connections to the network part.

The elements of the network part of the communication system are functionally represented and are defined in terms of separate levels. The mobile and correspondent nodes 12 and 18 form parts of an application level 22. The application level of the network part of the communication system includes application servers, of which four application servers, application servers 24, 26, 28 and 30 are shown in the figure. The application server 26 is designated as a home-network application server of the mobile node, indicated in the figure as ASh. And, the mobile node is positioned at a location in the figure such that the application server 24 forms the visited-network application server, indicated in the figure by ASv, through which the mobile node communicates when positioned at its roaming position indicated in the figure. And, the application server 28 forms a visited-network application server through which the correspondent node 18 communicates. The home-network application server of the correspondent node, merely for purposes of example, also forms the application server 30.

The communication system also includes a transport level 34, here including AAA (Authentication Authorization Accounting) infrastructure that includes a plurality of AAA entities 36, 38, 40, and 42. The AAA entity 36 forms a visited-network AAA entity associated with the visited-network application server 24. The AAA entity 38 forms a home-network AAA entity associated with the application server 26. The AAA entity 40 forms a home-network AAA associated with the application server 30. And, the AAA entity 42 forms a visited-network AAA associated with the visited-network application server 28.

The network part of the communication system also includes bearer managers associated with different access networks of the communication system. Here, a single bearer manager 46 is shown. The bearer manager is associated with an access network forming the visited-network at which the mobile node is positioned. Other access networks, such as an access network forming the visited-network at which the correspondent node is located. The bearer manager is functionally operable to perform bearer setup to create the bearer upon the radio link 14 to permit the communications with the mobile node 12 to be effectuated and possibly other links between MN and CN.

As noted above, existing proposals for operation of the communication system pursuant to the operating standard of the proposed IETF system is inadequate to efficiently facilitate setup of the bearer to permit communications with the mobile node 12. According to an embodiment of the present invention, apparatus, here shown by the blocks 46 at various of the elements of the network part of the communication system, provide a manner by which to facilitate a network-initiated bearer setup in which one, or more, network entities set up the bearer on behalf of the mobile node. Through operation of the apparatus 46, of its various implementations described more fully hereinbelow, a manner is provided by which a network element, whether located at a home network or a visited network of the mobile node, to initiate a request for an appropriate bearer manager, here the bearer manager 46, to perform the bearer setup. Bearer setup is initiated utilizing existing functional structure already set forth in the proposed standard of the IETF.

Figure 2:
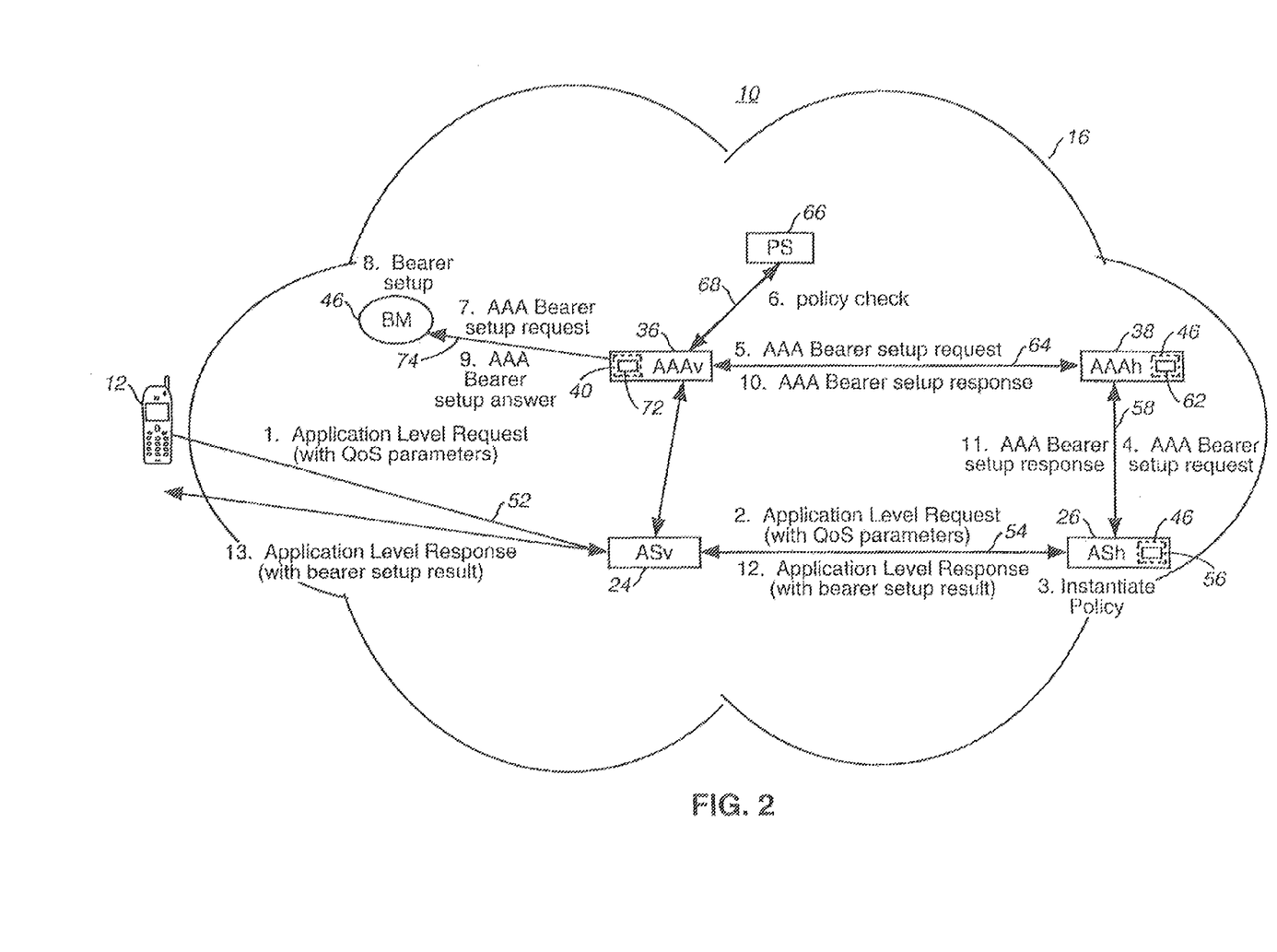
FIG. 2 illustrates a functional block diagram of portions of the communication system shown in FIG. 1.

FIG. 2 illustrates portions of the communication system 10, here to represent operation of an embodiment of the present invention by which a network-initiated bearer setup is performed.

Again, the mobile node is positioned at a visited network to communicate by way of the visited-network application server, here an SIP (Session Initiation Protocol) server, 24.

When mobile-originated communications are to be effectuated, an application-level QoS request, here indicated by the segment 52, is generated by the mobile node, communicated by way of the radio link and to the visited-network application server 24. The application-level request, with the QoS parameters, is then routed by the visited-network application server to the home-network application server 26 of the mobile node. The routing is indicated in the figure by the segment 54.

The apparatus 46 includes an application-level bearer setup request signal generator 56. The generator generates a bearer setup request signal, indicated by the segment 58. The signal utilizes AAA protocol, and the request is provided to the home-network AAA entity 34. Upon receiving the AAA-protocol request, the home-network AAA entity performs authentication and authorization procedures. Upon successful authentication and authorization, the apparatus 46 forwards the AAA bearer setup request, here indicated by the segment 64, to the visited-network AAA entity 36. Here, the visited-network AAA entity checks for related policies with a policy server (PS) 66. The policy check and corresponding reply, are indicated by the segment 68. Upon successful policy checking, the visited-network AAA entity also includes a bearer setup request signal generator 72 forming a part of the apparatus 46 thereof that forwards the AAA bearer setup request signal, indicated by the segment 74 that is provided to the bearer manager. Upon detection, by the bearer manager of the setup request, the bearer manager performs the bearer setup.

Then, the bearer manager generates a response that is routed in the reverse direction, also indicated by the segment 74 back to the visited-network AAA entity 36. The apparatus 46 of the visited-network AAA entity forwards on the response, here indicated also by the segment 64 to the home-network AAA entity. The signal generator 56 of the home-network AAA entity further operates to forward on the AAA bearer setup response, also indicated by the segment 58 back to the home-network application server 26. The signal generator 56 of the apparatus of the home-network application server generates an application-level signal that is returned to the visited-network application server. The signal generated by the signal generator 56 also includes a QoS response, responsive to the QoS request generated by the mobile node. The response generated by the signal generator 56 is detected by the visited-network application server and is returned, indicated by the segment 52, to the mobile node forming a communication end point. Thereby, a bearer is setup utilizing the existing structure of the network part of the communication system. Mere extensions to the existing AAA signaling protocol to permit formation of the messages indicated by the segments 58 and 64 are required.

Figure 3:
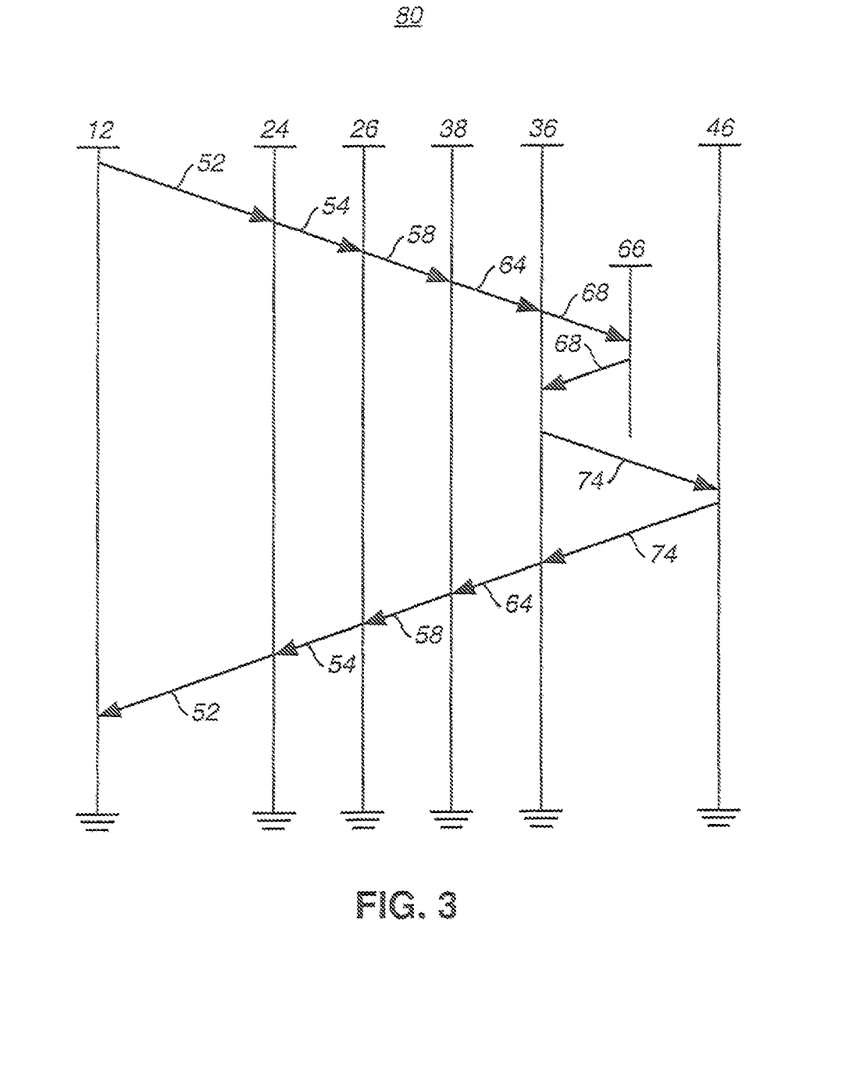
FIG. 3 illustrates a message sequence diagram representative of signaling generated during operation of an embodiment of the present invention embodied at the communication system shown in FIG. 2.

FIG. 3 illustrates a message sequence diagram, shown generally at 80, representative of signaling generated during operation of the embodiment of the present invention embodied in the communication system shown in FIG. 2. First, and as indicated by the segment 52, the mobile node generates an application level signaling that contains a QoS request, which is forwarded to the visited-network application server 24. The visited-network application server, in turn, forwards on the application-level request that contains the QoS parameters, indicated by the segment 54, to the home-network application server 26. The bearer setup request signal generator 56 of the home-network application server, in turn, generates an AAA-protocol bearer setup request signal, indicated by the segment 58, that is routed to the home-network AAA entity 62. The home-network AAA entity, in turn, forwards on the request, indicated by the segment 64, to the visited-network AAA entity 36. A policy check is performed with the policy server 66, and the policy check request and response thereto are indicated by the segment 68. The signal generator of the visited-network AAA entity 36, in turn, forwards the AAA bearer setup request, indicated by the segment 74 that is provided to the bearer manager 46. The bearer manager performs the bearer setup and generates a response that is routed, indicated by the segment 74, back to the visited-network AAA entity 36. The entity 36 forwards the response, indicated by the segment 64, to the home-network AAA entity. The signal generator 62 thereof forwards the AAA bearer setup response that is provided to the home-network application server 26. Such signal is indicated by the segment 58. The signal generator of the home-network application server, in turn, generates an application-level response, here indicated by the segment 54, that is provided to the visited-network application server. When received at the visited-network application server, the response, together with a QoS response is forwarded, indicated by the segment 52, on to the mobile node.

Figure 4:
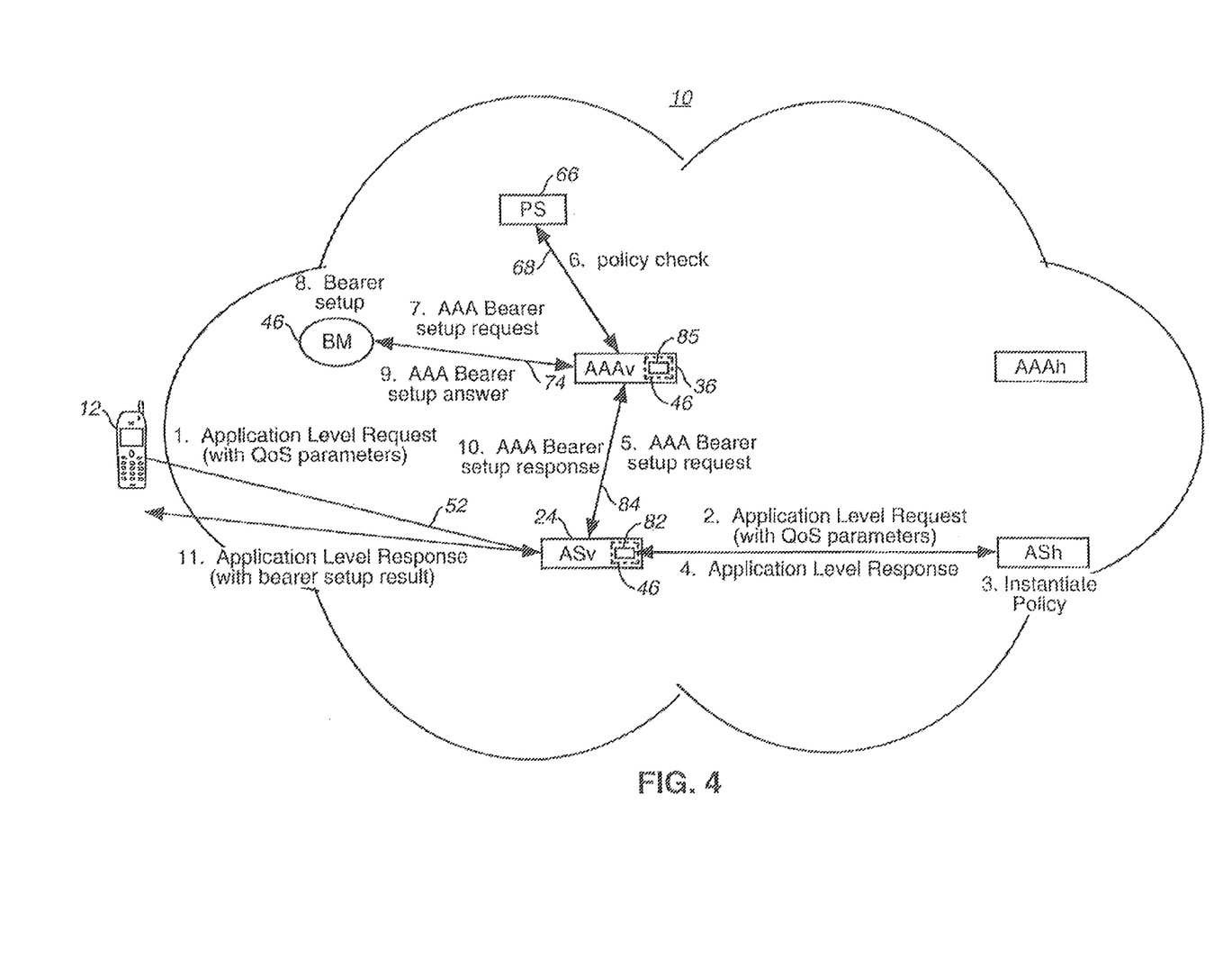
FIG. 4 illustrates a functional block diagram, similar to that shown in FIG. 2, also of portions of the communication system shown in FIG. 1, here to represent operation of another embodiment of the present invention.

FIG. 4 also illustrates portions of the communication system shown in FIG. 1. Here, operation of an alternate embodiment of the present invention is represented by which to facilitate bearer setup to permit communication between the mobile node and the correspondent node (shown in FIG. 1) pursuant to a network-initiated bearer setup. Here, the bearer setup is performed entirely at the visited network without muting of signaling back to the home network of the mobile node, except the authentication and authorization for the request.

The apparatus 46 includes a portion located at, or associated with, the visited-network application server 24. This portion of the apparatus includes a bearer setup request signal generator 82. The signal generator 82 is operable responsive to detection at the visited-network application server of the QoS request generated by the mobile node, and here again indicated by the segment 52. The signal generator generates an AAA bearer setup request signal, here indicated by the segment 84, that is forwarded to the visited-network AAA entity 36. The signal generated by the signal generator 82 is formed utilizing AAA protocol.

The apparatus 46 of the visited-network AAA entity detects the setup request signal generated by the signal generator 82. Responsive thereto, a policy check is performed, indicated by the segment 68, with the policy server (PS) 66. Upon successful policy checking, the apparatus 46 forwards the AAA bearer setup request signal, indicated by the segment 74, that is forwarded to the bearer manager 46. The bearer manager operates to set up the bearer for the mobile node, thereby to permit communications by, and with, the mobile node.

A response is generated by the bearer manager that is routed back to the visited-network AAA entity, also indicated by the segment 74. The signal generator 84 is further operable to forward on the response, indicated by the segment 84 back to the visited-network application server. The signal generator 82, in turn, generates an application-level response, including the QoS request response, back to the mobile node.

Figure 5:
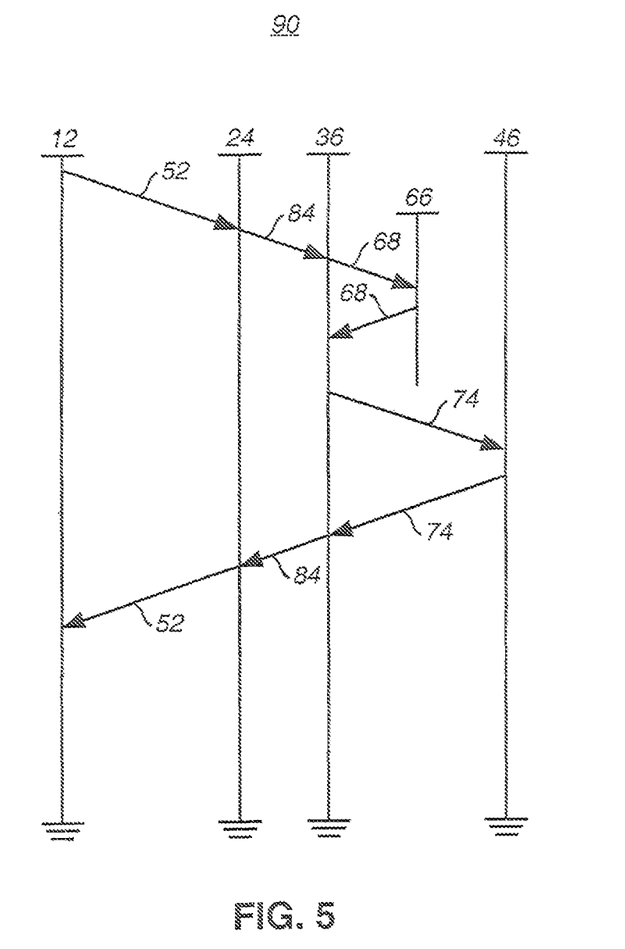
FIG. 5 illustrates a message sequence diagram representative of signaling generated during operation of another embodiment of the communication system shown in FIG. 4.

FIG. 5 illustrates a message sequence diagram, shown generally at 90, representing the signaling generated during operation of the embodiment of the present invention represented in FIG. 4. Corresponding to the segments shown in FIG. 3, the mobile node generates the application level QoS request, indicated by the segment 52, that is supplied to the visited-network application server 24. The signal generator 82 thereof, in turn, generates the AAA-protocol, bearer signal request generator that is forwarded to the visited-network AAA entity 36. A policy check is performed with the policy server 66 in which the policy check request and the response thereto are indicated by the segment 68. Upon successful policy checking, the visited-network AAA entity forward the AAA bearer setup request signal, indicated by the segment 74, that is provided to the bearer manager 46. The bearer manager performs bearer setup and generates a response that is returned, indicated by the segment 74, to the visited-network AAA entity. The signal generator of the visited-network AAA entity, in turn, forwards on the AAA bearer setup response, indicated by the segment 84, back to the visited-network application server. The visited-network application server sends an application-level response back to the mobile node 12.

Figure 6:
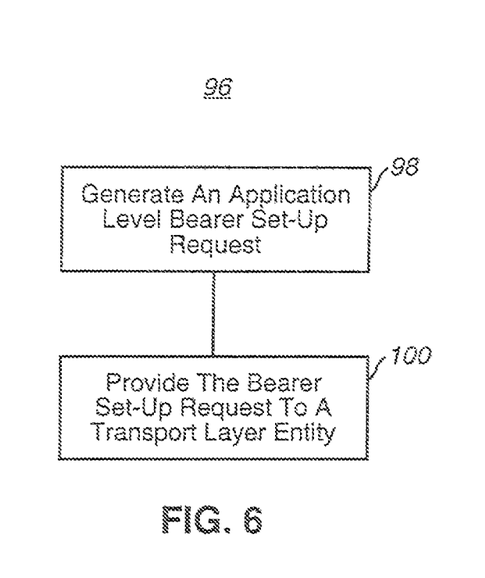
FIG. 6 illustrates a method flow diagram listing the method steps of the method of operation of an embodiment of the present invention.

FIG. 6 illustrates a method, shown generally at 96, of the method of operation of an embodiment of the present invention. The method facilitates bearer setup of a bearer between a mobile node and a correspondent node through operation of a selected bearer manager.

First, and as indicated by the block 98, a first bearer setup request is generated at a first application-level entity. The first bearer setup request requests the selected bearer manager to create the bearer between the mobile node and the correspondent node. The first bearer setup request, when generated at the first application-level entity, is free of the network identifier identifying the network location. Then, and as indicated by the block 100, the first bearer setup request is provided to a transport-level signaling layer entity.

Through operation of an embodiment of the present invention, therefore, existing functional entities of a communication system are utilized to request bearer setup to be performed by a bearer manager to create a bearer permitting a mobile node operable in the communication system to communicate thereon.

The preferred descriptions are of preferred examples for implementing the invention, and the scope of the invention should not necessarily be limited by this description. The scope of the present invention is defined by the following claims.

What is claimed is:

1. An apparatus for facilitating bearer setup initiated by a network, the apparatus comprising:
a bearer setup request generator, comprising hardware, associated with at least one application-level entity, said bearer setup request generator configured to:
generate an application-level bearer setup request to induce a selected bearer manager to create a bearer between a first node and a second node, wherein the application-level bearer setup request is free of network address identifiers for the selected bearer manager; and
provide the application-level bearer setup request to at least one first transport-level entity;
wherein, upon receiving the application-level bearer setup request, the at least one first transport-level entity is configured to send a transport-level bearer setup request to at least one second-transport level entity; and
wherein the at least one first transport-level entity is associated with a home network of the first node, and wherein the second transport-level entity is associated with a visited network of the first node.

2. The apparatus of claim 1, wherein the at least one application-level entity is associated with the home network.

3. The apparatus of claim 1, further comprising a receiving component to receive the application-level request from a mobile node.

4. The apparatus of claim 1, wherein the bearer setup request generator is further configured to generate the application-level bearer setup request in response to reception of an application-level request from a mobile node.

5. The apparatus of claim 4, wherein the application-level request comprises one or more quality of service parameters.

6. The apparatus of claim 1, wherein the bearer setup request generator is a component of an application server.

7. The apparatus of claim 1, wherein the bearer comprises a radio link connection between the first node and the second node.

8. The apparatus of claim 1, wherein the bearer is based on at least a requested data transmission rate threshold, a requested delay threshold, and a requested bit error ratio threshold.

9. An apparatus for facilitating bearer setup initiated by a network, the apparatus comprising:
a processor;
a memory communicatively coupled to the processor; and
computer-executable instructions stored in the memory, which when executed by the processor, cause performance of operations comprising:
generating in at least one application-level entity an application-level bearer setup request to induce a selected bearer manager to create a bearer between a first node and a second node, wherein the application-level bearer setup request is free of network address identifiers for the selected bearer manager; and
providing the application-level bearer setup request to at least one first transport-level entity;
wherein, upon receiving the application-level bearer setup request, the at least one first transport-level entity is configured to send a transport-level bearer setup request to at least one second-transport level entity; and
wherein the at least one first transport-level entity is associated with a home network of the first node, and wherein the at least one second transport-level entity is associated with a visited network of the first node.

10. The apparatus of claim 9, wherein, the application-level entity is associated with the home network.

11. A method for facilitating bearer setup of a network, the method comprising:
generating, at an application server, an application-level bearer setup request to induce a selected bearer manager to create a bearer between a first node and a second node, wherein the application-level bearer setup request is free of network address identifiers for the selected bearer manager; and
providing, by the application server, the application-level bearer setup request to at least one first transport-level entity, wherein, upon receiving the application-level bearer setup request, the at least one first transport-level entity is configured to send the bearer setup request to at least one second-transport level entity;
wherein the at least one first transport-level entity is associated with a home network of the first node, and wherein the at least one second transport-level entity is associated with a visited network of the first node.

12. The method of claim 11, wherein the application server is associated with the home network.

13. An apparatus for facilitating bearer setup of a network, the apparatus comprising:
a processor;
a memory communicatively coupled to the processor; and
computer-executable instructions stored in the memory, which when executed by the processor, cause performance of operations comprising:
generating an application-level bearer setup request to induce a selected bearer manager to create a bearer between a first node and a second node; and
providing the application-level bearer setup request to at least one first transport level entity;
wherein, upon receiving the application-level bearer setup request, the at least one first transport-level entity is configured to send a transport-level bearer setup request to at least one second-transport level entity; and
wherein the at least one first transport-level entity is associated with a home network of the first node, and wherein the at least one second transport-level entity is associated with a visited network of the first node.

* * * * *